US009795092B2

(12) United States Patent
Newbegin

(10) Patent No.: US 9,795,092 B2
(45) Date of Patent: Oct. 24, 2017

(54) CIRCLE IN-LINE EMITTER

(71) Applicant: Edward Newbegin, Tualatin, OR (US)

(72) Inventor: Edward Newbegin, Tualatin, OR (US)

( * ) Notice: Subject to any disclaimer, the term of this patent is extended or adjusted under 35 U.S.C. 154(b) by 175 days.

(21) Appl. No.: 14/838,270

(22) Filed: Aug. 27, 2015

(65) Prior Publication Data

US 2017/0055466 A1    Mar. 2, 2017

(51) Int. Cl.
| | | |
|---|---|---|
| *B05B 15/00* | (2006.01) | |
| *A01G 25/00* | (2006.01) | |
| *B05B 1/30* | (2006.01) | |
| *B05B 15/02* | (2006.01) | |
| *B05B 15/06* | (2006.01) | |
| *B05B 1/04* | (2006.01) | |
| *B05B 1/20* | (2006.01) | |
| *A01G 25/02* | (2006.01) | |

(52) U.S. Cl.
CPC .......... *A01G 25/00* (2013.01); *A01G 25/023* (2013.01); *B05B 1/046* (2013.01); *B05B 1/20* (2013.01); *B05B 1/3006* (2013.01); *B05B 15/0291* (2013.01); *B05B 15/069* (2013.01); *A01G 2025/006* (2013.01)

(58) Field of Classification Search
CPC .................. A01G 25/00; A01G 25/023; A01G 2025/006; B05B 15/0291; B05B 1/046; B05B 15/069; B05B 1/20; B05B 1/3006
USPC ....... 239/533.1, 533.13, 542, 547, 566, 567, 239/570; 138/42, 43
See application file for complete search history.

(56) References Cited

U.S. PATENT DOCUMENTS

| 4,022,384 A * | 5/1977 | Hoyle .................... A01G 25/02 239/542 |
| 4,824,025 A * | 4/1989 | Miller .................. A01G 25/023 239/547 |
| 4,960,584 A | 10/1990 | Brown |

(Continued)

FOREIGN PATENT DOCUMENTS

| JP | 2001178284 A | 7/2001 |
| KR | 10-1264468 B1 | 5/2013 |
| WO | WO2016071722 A1 | 5/2016 |

OTHER PUBLICATIONS

International Patent Application No. PCT/US2016/048184; International Search Report and Written Opinion mailed Nov. 18, 2016.

(Continued)

*Primary Examiner* — Steven J Ganey
(74) *Attorney, Agent, or Firm* — Schwabe Williamson & Wyatt, P.C.

(57) ABSTRACT

A fluid flow emitter is provided, which is to be mounted within a fluid distribution tube to control the rate at which fluid is distributed from the tube. The emitter may include a cylindrical body having a pair of raised radially-extending annular portions extending circumferentially around the emitter. These raised portions define a fluid flow path. The body may define a multiplicity of apertures making up an aperture region disposed between the radially-extending annular portions. A flow control section is also provided which includes an upstream end and a downstream end. A fluid distribution region is also provided, into which the flow control section discharges. The fluid distribution region is in fluid interconnection with at least one orifice defined in the fluid distribution tube.

26 Claims, 14 Drawing Sheets

(56) References Cited

U.S. PATENT DOCUMENTS

| | | | |
|---|---|---|---|
| 5,330,107 A * | 7/1994 | Karathanos | A01G 25/023 |
| | | | 239/542 |
| 6,817,548 B2 | 11/2004 | Krauth | |
| 2003/0226913 A1 | 12/2003 | Brunnengraeber | |
| 2012/0126036 A1 | 5/2012 | Patel | |
| 2014/0070029 A1 | 3/2014 | Alkalay | |

OTHER PUBLICATIONS

Dermitzakis, Aristeidis; electronic correspondence transmitting HydroTech Engineering publications; Oct. 5, 2016.

Hydrotech Engineering; "New Filtering System for Cylindrical Dripper;" publication; Oct. 2016.

Hydrotech Engineering; "Teaser—New Filtering System for Cylindrical Dripper;" publication; Oct. 2016.

\* cited by examiner

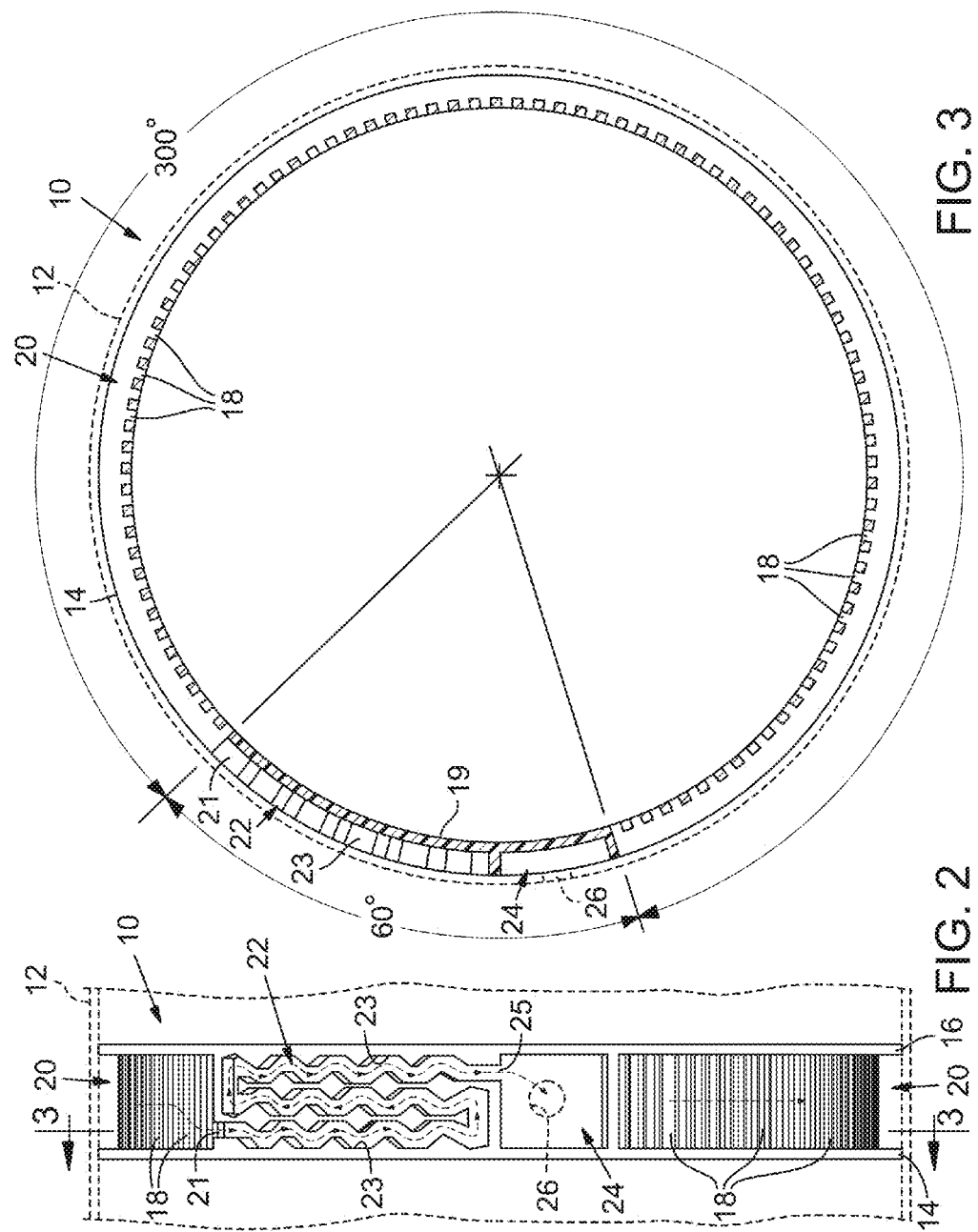

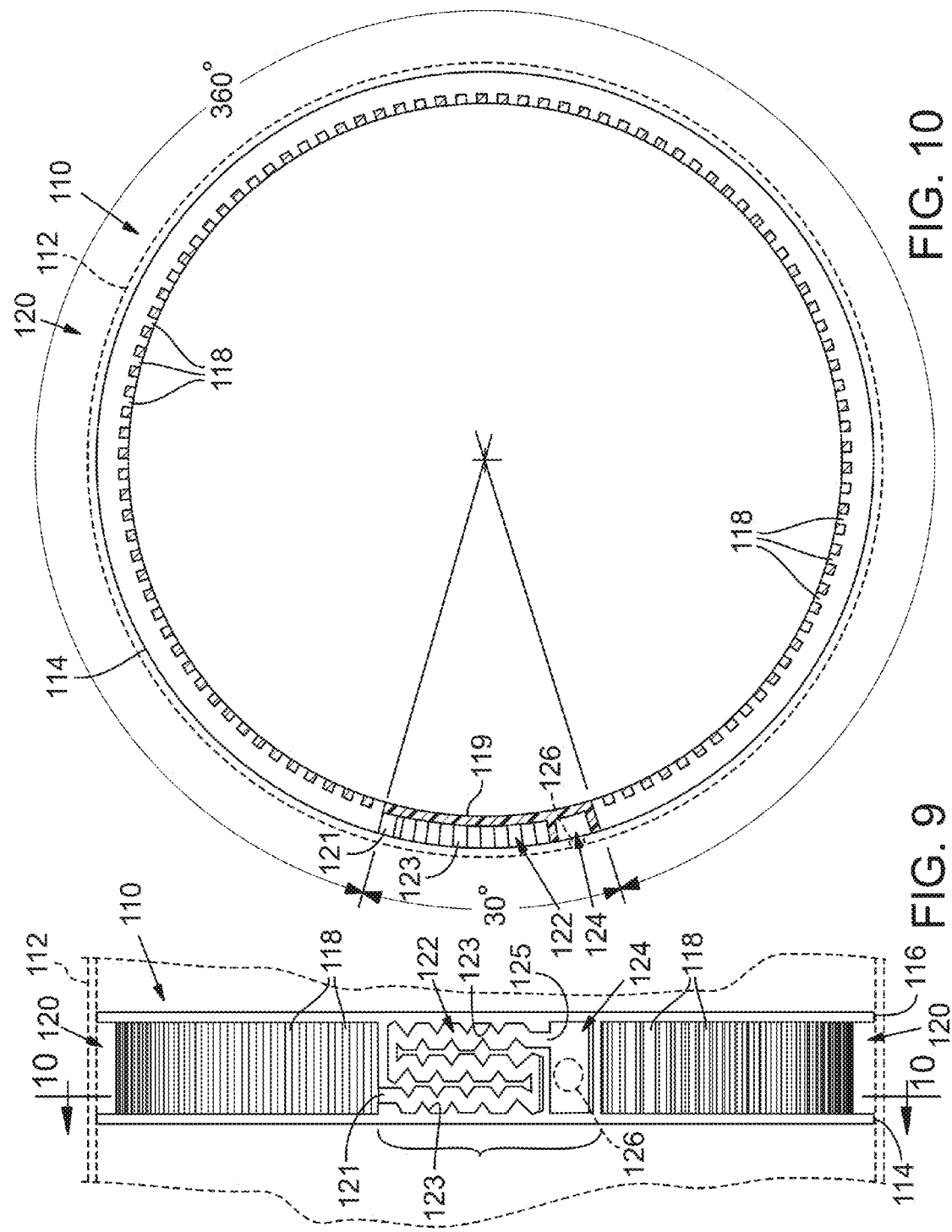

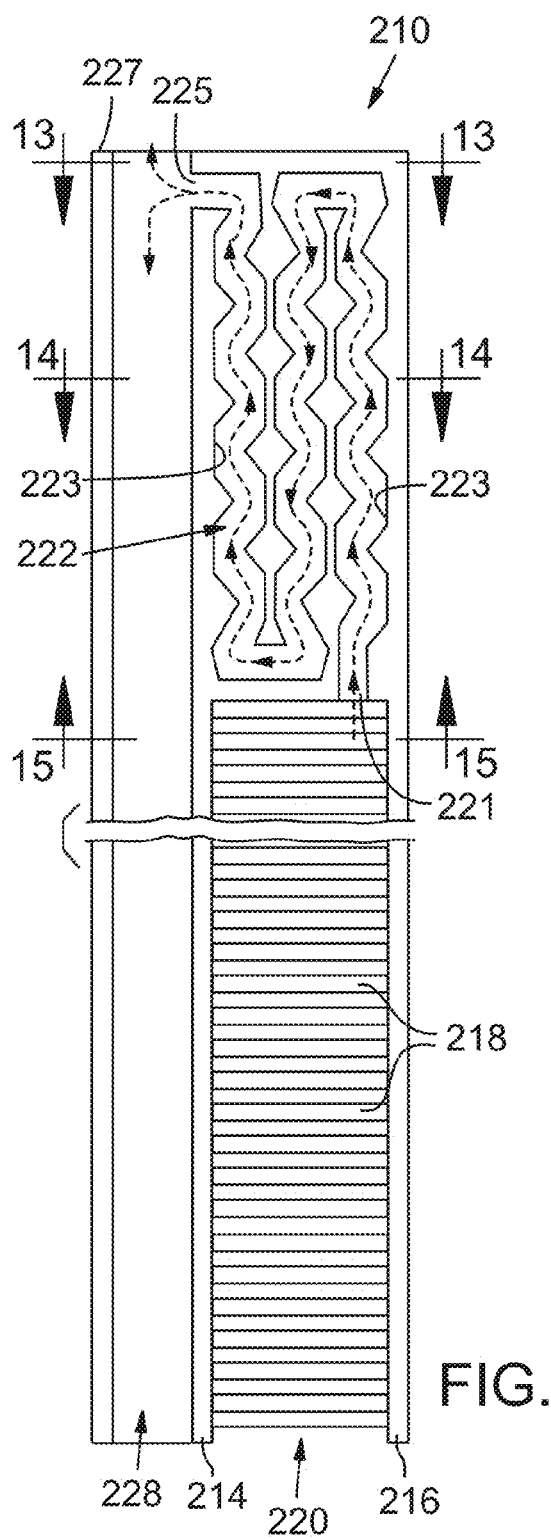
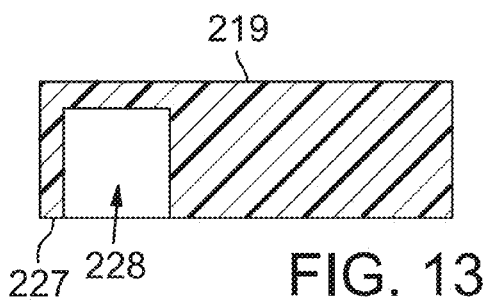
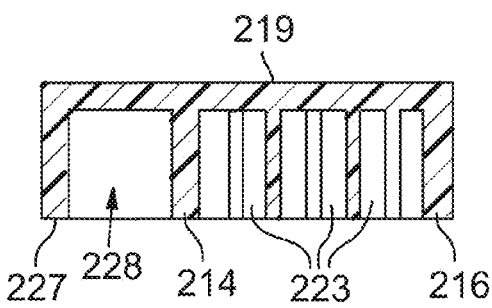
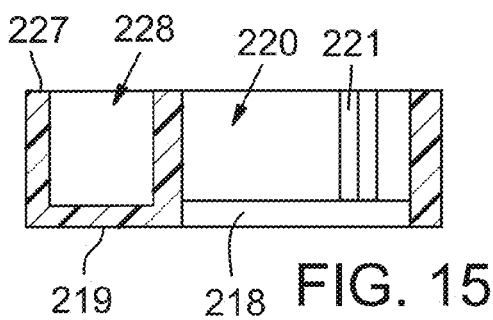
FIG. 12
FIG. 13
FIG. 14
FIG. 15

CIRCLE IN-LINE EMITTER

FIELD OF THE INVENTION

The present invention relates to fluid distribution emitters that are installed in fluid distribution tubing.

BACKGROUND

Fluid distribution emitters are used in many applications where fluid needs to be distributed over a large area and in a slow and controlled rate. One application is in mining where chemistry is distributed over large collections of material such as copper ore or gold ore to leach materials out of the ore. Such systems largely solved the problem of chemicals being sprayed or sprinkled onto the leaching field, such as the fluid freezing as it is blown into the air at high elevations, and dispersion of hazardous chemicals into adjacent areas. Emitters are also used in drip irrigation systems where the flow rate needs to be carefully controlled. Thus, the present invention may be usable in a wide variety of mining, agriculture and landscape settings. In each setting, it is desirable to control the amount of fluid that flows through such a system over a given period of time. Flow rates are typically measured in liquid volume per unit of time, such as gallons per hour (gph).

Historically, such flow-rate devices can be susceptible to plugging due to many factors, such as the presence of particulates like leaching chemicals precipitating out of fluid being distributed, scale build up due to water hardness, introduction of carbon used in treatment processes into the drip lines, and sediment settling into the screens of emitters that are downwardly facing. Such particulates may also result from sediment in an irrigation water source or contamination of the irrigation water source.

Typically, emitters designed to achieve lower flow rates are more susceptible to such plugging. In both mining and agricultural settings, the lower the pressure, the lower the flow rate will be, and the more susceptible the system will be to plugging. Plugging can also occur as a result of pressure fluctuations and changes in elevation. Plugged emitters are in many ways more problematic than no emitters at all because the operator will assume that fluid is being evenly distributed across the leach field or to the plants being irrigated, when in fact none of that is happening at all.

While employing filters to remove contaminants in leaching and irrigation systems may reduce the frequency of plugging in flow-rate control devices, filters are typically expensive, and their use may be cost prohibitive in certain applications. Moreover, filtration systems often cannot be included at enough spots along the lines to prevent blockages. Therefore, alternatives to conventional flow rate control devices are desirable.

One effective solution to the plugging problem has been the development of an inline emitter, that is, one that is positioned within and coaxial with the extension of the tubing. One such emitter is disclosed in U.S. Pat. No. 6,817,548 and has been marketed by R.M. Wade & Co. as the Max Emitter®. This emitter is shown in FIG. 1 and has been highly successful in overcoming the plugging problem with conventional emitters. However, emitter flow rates have been reduced lower and lower and the spacing between the emitters is getting increasingly small in order to more evenly distribute fluid in both irrigation and mining applications. For example, while in the past emitters might have been on a 24 inch spacing for irrigation applications and 32 inch spacing for mining, such spacing might now be on 12 inch and 15 inch spacing, respectively. This has dramatically increased the cost of emitting operations and resulted in the use of smaller and less expensive emitters.

One such smaller emitter is the so-called pill or flat emitter, which is positioned on one side of a tubing line. One such emitter is shown in FIGS. 1B and 1C. This emitter is very small in size and can be used in lightweight tubing, and is therefore less expensive than other solutions proposed for the plugging problem. However, the flat emitter is, like some earlier units, susceptible to plugging because, like older-style emitters, it is positioned on one side of the tubing and, if positioned on the downward side of the emitter line as shown in FIG. 1B, it can quickly become plugged and nonfunctional because sediment will settle into its grids, which is the small, lower stepped down area to the left side of the emitter in FIG. 1B. Also, given that pill emitters typically have only a single hole through which fluid is expected to flow to the leach field or the plantings, particulate in the fluid can easily plug that single source of fluid distribution.

SUMMARY OF THE INVENTION

In accordance with an embodiment of the invention, a fluid distribution emitter installed inside tubing is provided. The emitter includes a short, hollow cylindrical body with a flow-rate control path formed in the cylindrical body.

BRIEF DESCRIPTION OF THE DRAWINGS

The subject matter regarded as the invention is particularly pointed out and distinctly claimed in the claims. The invention, however, both as to organization and method of operation, together with features and advantages thereof, may best be understood by reference to the following detailed description when read with the accompanying drawings in which:

FIG. 2 is a side elevation view of the embodiment of FIG. 1, again, with the fluid distribution tube shown in phantom;

FIG. 3 is a sectional view taken along line 3-3 of FIG. 2, looking through an end of the tubing with the emitter disposed in the tubing, showing that the so-called labyrinth portion of the emitter may comprise 60 degrees of the circular emitter;

FIG. 9 is a side elevation view of a second embodiment, with the tubing shown in phantom;

FIG. 10 is a sectional view taken along line 10-10 of FIG. 9, looking through an end of the fluid distribution tube with the emitter disposed in the tube, showing that the labyrinth portion of the emitter may comprise 30 degrees of the circular emitter;

FIG. 12 is a schematic, fragmentary, two-dimensional representation of the surface configuration of a portion of the embodiment of FIG. 11;

FIG. 13 is a sectional view taken along line 13-13 of FIG. 12;

FIG. 14 is a sectional view taken along line 14-14 of FIG. 12;

FIG. 15 is a sectional view taken along line 15-15 of FIG. 12;

DETAILED DESCRIPTION

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As indicated above, flow-rate control devices for drip irrigation systems may, for example, be susceptible to plugging, especially at lower flow rates. Such "lower" flow rates may be on the order of one-half to one-quarter gallon per hour (gph). Such emitters are sometimes referred to as inline emitters, but that term is also used to describe an emitter that has its two ends positioned within two spaced pieces of tubing to interconnect the tubing and to facilitate fluid distribution from a point between the adjacent ends. The term "inline emitter" as used herein is not making reference to such an emitter, but is only making reference to an emitter that is positioned entirely within one (or possibly two abutting) piece (s) of tubing. Because these types of inline emitters include labyrinth flow paths, they are also sometimes referred to as "labyrinth emitters."

In use, such an emitter would typically be inserted inside an appropriately sized tubing or pipe, as will be discussed in more detail hereinafter. These types of emitters are generally cylindrical in shape and may be molded of high-density polyethylene using a two die molding process. The center of the emitter would typically be hollow to allow fluid, typically water under pressure for irrigation applications, to flow into the body of the emitter. As discussed above, when used to leach ore, for example, the emitters may be used to distribute liquid chemical treatments.

The Embodiment of FIGS. 1-8

Figure 1A:
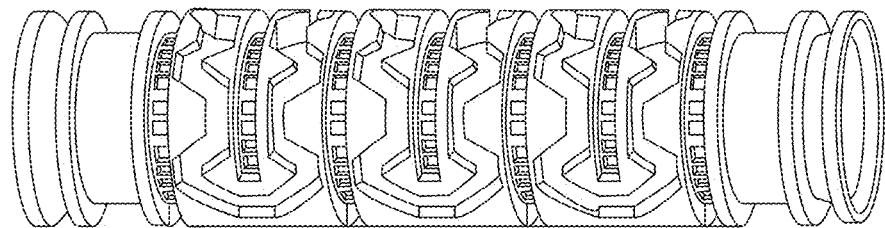
FIG. 1A is a side elevation view of a prior art Max Emitter in accordance with U.S. Pat. No. 6,817,548.
Figure 1B:
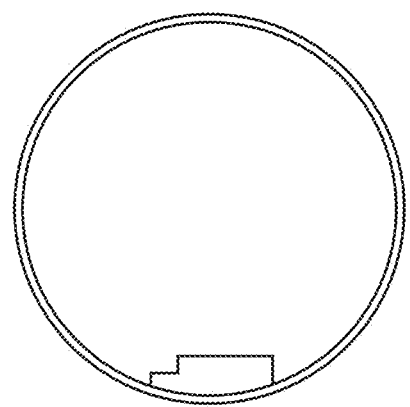
FIG. 1B a schematic end elevation view of a prior art flat emitter disposed in a fluid distribution tube, showing the flat emitter in silhouette.
Figure 1C:
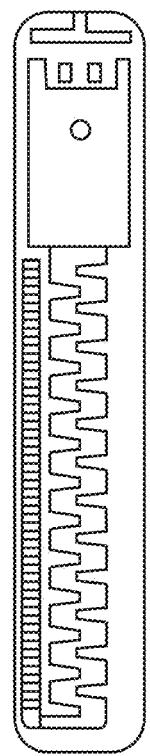
FIG. 1C is a plan view of the prior art flat emitter of FIG. 1B without showing the fluid distribution tube.
Figure 1D:
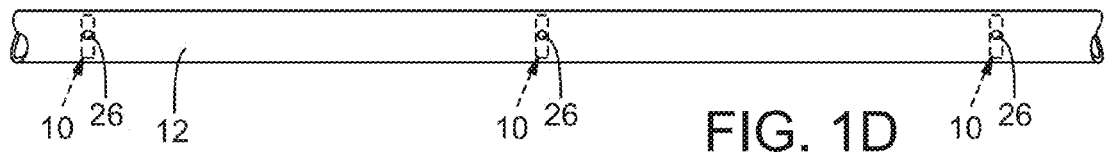
FIG. 1D is a schematic side elevation view showing a plurality of emitters of FIGS. 1-8 disposed in a fluid distribution tube.
Figure 1:
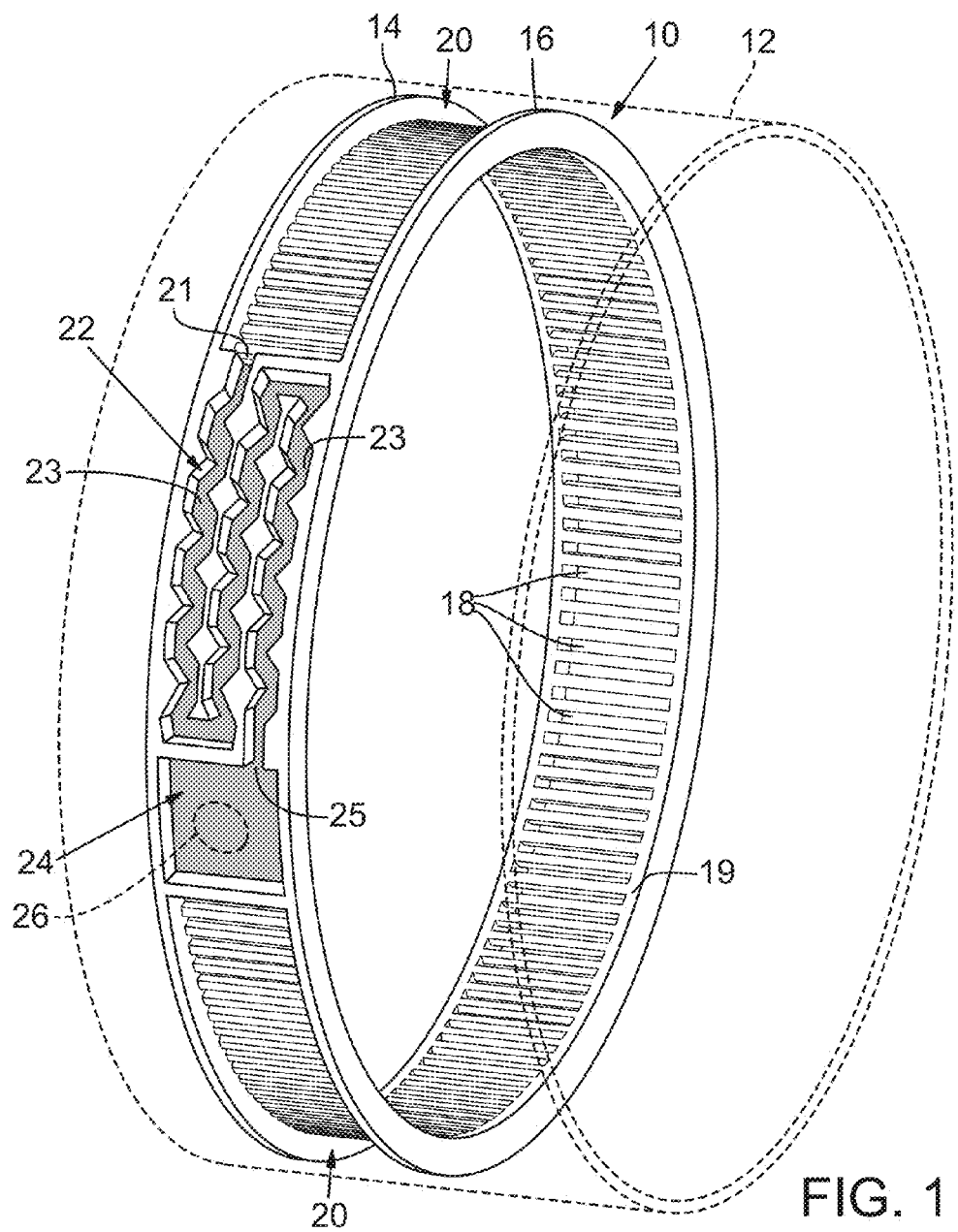
FIG. 1 is an isometric view of a first embodiment with the fluid distribution tube in which it may be positioned depicted in phantom.
Figure 4:
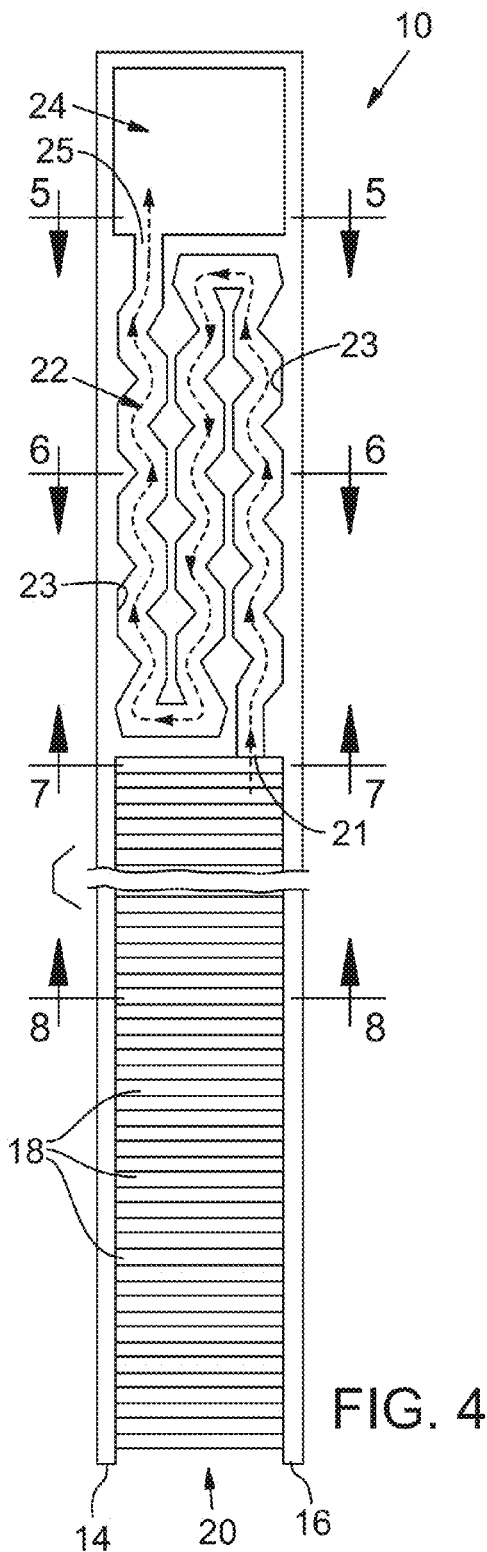
FIG. 4 is a schematic, fragmentary, two-dimensional representation of the surface configuration of a portion of the embodiment of FIG. 1.

In FIG. 1D, a schematic view, it can be seen that a plurality of emitters 10 are typically disposed in a fluid distribution tube 12, with tube orifices 26 in the tube, as will be explained more fully below. Tube 12 is shown in phantom in FIG. 1 and the remaining figures. Perhaps it is best seen in FIG. 1D that the emitters 12 extend transversely to the direction of flow of fluid through fluid distribution tube 12. As is typical with in line emitters, emitter 10 includes a number of surface features that are formed as part of the molding process. FIG. 4 is a two-dimensional representation of the surface configuration of emitter 10. In FIG. 4, the cylindrical body has been split, rolled out, and is depicted in a planar view.

Emitter 10 includes a first and a second annular sealing portion 14 and 16, respectively, at the distal ends of the emitter 10. First and second annular sealing portions 14 and 16 may be described as radially- and circumferentially-extending portions, and typically effect fluid-tight seals when emitter 10 is inserted in, or disposed within, an appropriately sized fluid distribution tube 12. Emitter 10 may also include screen areas including a multiplicity of slots 18, preferably defined in the inner periphery of an annular body 19 extending around much of the circumference of the emitter in an axial direction, or in other words, in the direction fluid would flow through fluid distribution tube 12. In the embodiment of FIGS. 1-8, slots 18 cover a slot region and are shown to extend from side to side of annular body 19 between first and second sealing portions 14 and 16. The term "slot" as used herein is intended to cover a small opening or aperture. If the slots are described as being axially-extending or extending from side to side, they should be considered be longer in one dimension than the other dimension. Otherwise, the slots may be no longer than they are wide. The slot region may alternatively be described as an aperture region, mesh or mesh region for filtering out particulates and other debris from the fluid flowing into emitter 10.

In this first embodiment, some of the fluid flowing through fluid distribution tube 12 flows through slots 18 and into a substantially U-shaped first fluid flow path 20 defined between first and second annular sealing portions 14 and 16, filling the first fluid flow path. Fluid flowing through slots 18 and into first fluid flow path 20 then flows into a labyrinth flow-rate control channel 23 in a labyrinth flow-rate control section 22, shown to extend back and forth and back again, substantially circumferentially around a portion of emitter 10. While a back and forth and back again labyrinth configuration is shown in this first embodiment, labyrinth flow control channel 23 might take other configurations and extend in a shorter or longer and more simple or more complex labyrinth. Labyrinth channel 23 can be seen to include long circumferentially-extending portions and much shorter axially-extending portions. In most applications it is desirable that the circumferentially-extending portions comprise at least 5 times the length of the axially-extending portions and in the depicted embodiment, the circumferentially-extending portions of labyrinth channel 23 are more than 10 times the length of the axially-extending portions.

From the labyrinth flow rate control section 22, fluid flows into a fluid distribution chamber 24, which may be defined by a surrounding plurality of walls. The fluid then flows out a fluid distribution orifice 26, shown in phantom, in the fluid distribution tube 12. While a single fluid distribution orifice 26 is shown in this first embodiment 10, additional orifices might be included to reduce the likelihood of plugging even further or to more evenly distribute fluid exiting from the emitter.

As can be been in FIG. 3, the flow control section 22 and fluid distribution chamber 24 are shown to cover approximately a 60 degree segment of the circumference of emitter 10, but in actuality they may cover more or less of the circumference as will be demonstrated more fully hereinbelow. It can be seen that within this section encompassed by flow control section 22 and fluid distribution chamber 24, there are no slots or apertures through which fluid would be entering the emitter 10 from fluid distribution tube 12.

Figure 5:
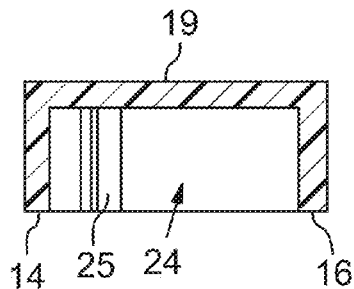
FIG. 5 is a sectional view taken along line 5-5 of FIG. 4.
Figure 6:
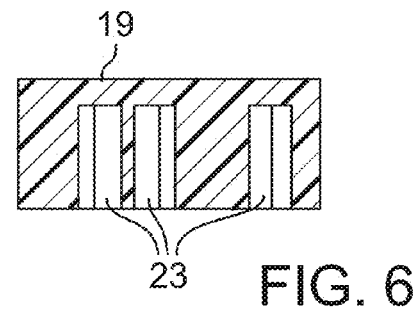
FIG. 6 is a sectional view taken along line 6-6 of FIG. 4, showing the labyrinth flow channel.
Figure 7:
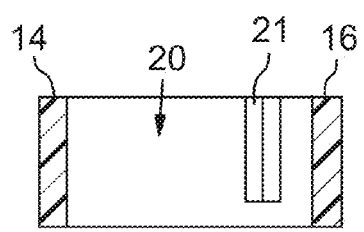
FIG. 7 is a sectional view taken along line 7-7 of FIG. 4, showing the upstream end of the labyrinth flow channel.
Figure 8:
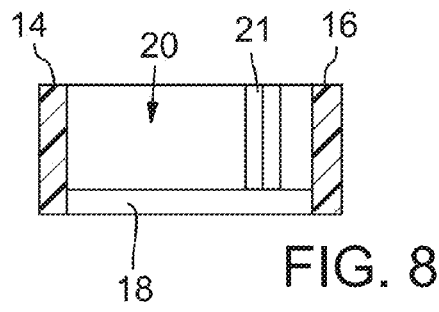
FIG. 8 is a sectional view taken along line 8-8 of FIG. 4, showing the upstream end of the labyrinth flow channel.

As shown in FIG. 5, fluid distribution chamber 24 may extend most of the depth of emitter 10 in order to provide a first fluid flow path that will provide sufficient fluid for labyrinth flow control section 22. Similarly, as shown in FIG. 6, the labyrinth flow control channel 23 also may extend most of the depth of emitter 10. This may be desirable to facilitate the flow of substantial amounts of fluid through the labyrinth despite the fact that labyrinth flow control channel 23 is narrow in configuration. Finally, FIG. 8 shows that the material defining slots 18 may be quite shallow, again, in order to provide a first fluid flow path of substantial depth to facilitate the flow of fluid therethrough.

Labyrinth flow control channel 23 includes upstream and downstream ends, 21 and 25 respectively, which, in the embodiment of FIGS. 1-8, extend circumferentially to receive fluid from first fluid flow path 20 and discharge that fluid into fluid distribution chamber 24. In the depicted embodiment it can be seen that labyrinth channel 23 extends entirely from a circumferential line in alignment with one of the pair of raised, radially-extending annular portions 14 to the other raised, radially-extending annular portion 16. It can also be seen that labyrinth channel 23 is in circumferential alignment with fluid distribution chamber 24.

Emitter 10 can be seen to provide a flow rate control capability in a very small unit that is inexpensive to fabricate and install in tubing, and because of the short length of the barrel of the emitter, it can be used with very flexible, light weight and therefore inexpensive fluid distribution tubing.

The Embodiment of FIGS. 9 and 10

The flow-rate associated with inline emitters depends on the hydraulic resistance of the labyrinth flow control section 22. In this regard, the depth, width and length of such a flow-rate control path all affect the flow rate for such emitters. The width of the flow path can be varied to control the flow rate in such emitters. However, the length of the flow rate control path can also be varied. As noted earlier, the embodiment of FIGS. 1-8 includes a labyrinth flow control section that encompasses 60 degrees of the circumference of emitter 10.

An emitter identified generally at 110 is shown in FIGS. 9 and 10 and encompasses only 30 degrees of the circumference. In other respects the emitter 110 may be similar to emitter 10 and for this reason, similar numbering is used in FIGS. 9 and 10 to identify tubing 112, first and second annular sealing portions 114 and 116, slots 118, annular body 119, first fluid flow path 120, labyrinth flow control section 122, labyrinth flow control channel 123 having an upstream end 121 and a downstream end 125, fluid distribution chamber 124 and fluid distribution orifice 126. While 30 degree and 60 degree labyrinth configurations are depicted herein, it should be understood that the labyrinth flow control section 122 might cover more or less of the circumference of the emitter.

The Embodiment of FIGS. 11-15

A third embodiment of an emitter is depicted in FIGS. 11-15 and identified generally at 210. Emitter 210 may be similar in many respects to emitters 10 and 110, and again, for this reason, similar numbering is used in FIGS. 11-15 to identify tubing 212, first and second annular sealing portions 214 and 216, slots 218, annular body 219, first fluid flow path 220, labyrinth flow control section 222, labyrinth flow control channel 223 having an upstream end 221 and a downstream end 225, and fluid distribution orifice 226.

However, emitter 210 may be different in that it typically includes an additional, circumferentially-extending channel that may be called a first fluid distribution channel 228, which may be provided in lieu of fluid distribution chamber 24 and 124 in the earlier embodiments. That is, instead of the wall that surrounds fluid distribution chamber 24 and 124, a circumferentially-extending wall 227 that may be referred to as a third radially extending annular portion is disposed co-axially with the pair of radially-extending annular portions. It can be seen from FIGS. 11 and 12 that first fluid distribution channel 228 may be interconnected with the downstream end 225 of labyrinth flow control channel 223 so after passing through slots 218, first fluid flow path 220 and labyrinth flow control section 222, fluid flows into first fluid distribution channel 228 and along the channel until it passes through fluid distribution orifice 226. It can be seen that downstream end 225 of labyrinth flow control channel 223 extends laterally or to the side, instead of circumferentially as in the prior embodiments.

Figure 11:
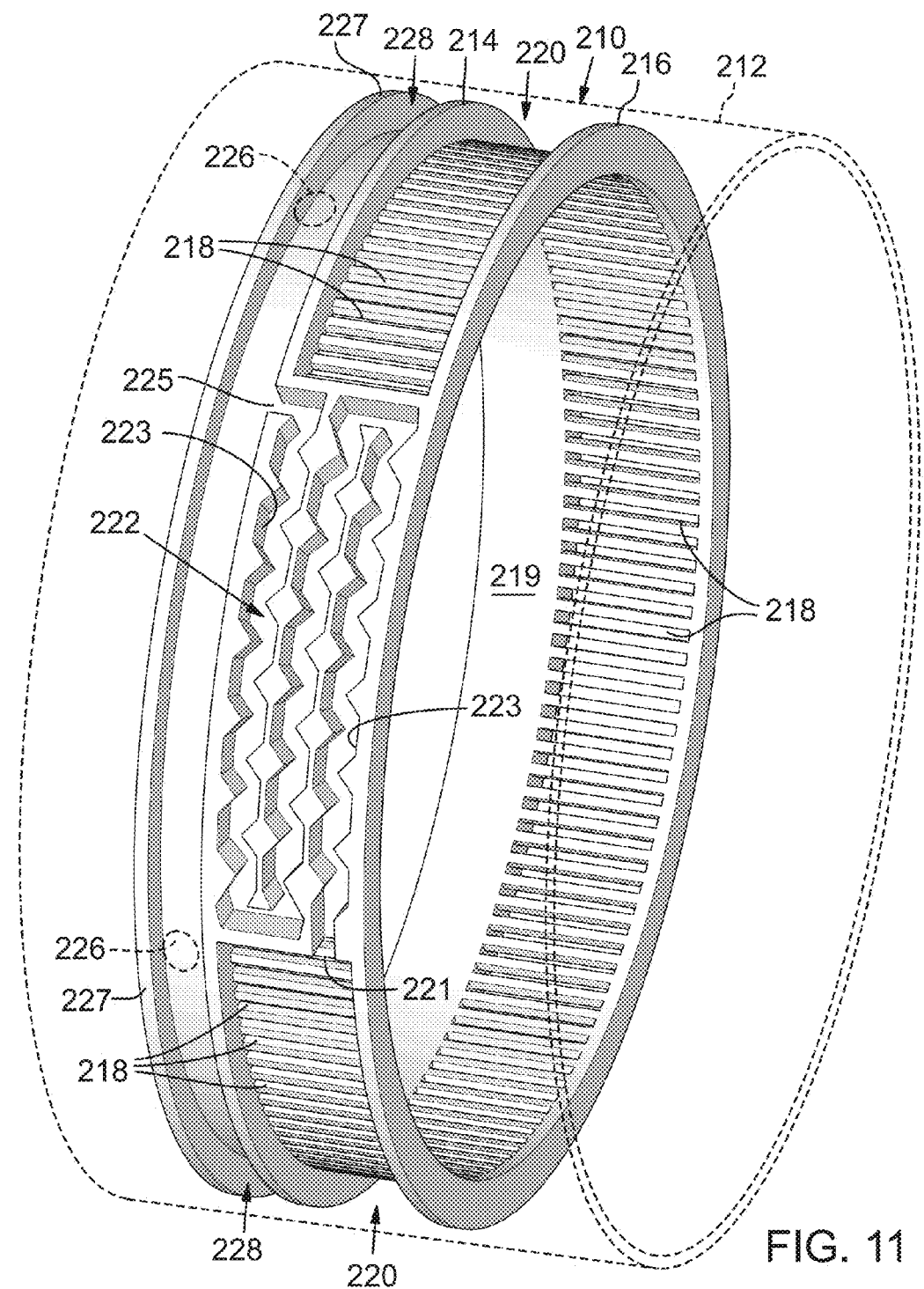
FIG. 11 is an isometric view of a third embodiment that includes a side fluid exit channel, with the fluid distribution tube in which it may be positioned depicted in phantom.

One fluid distribution orifice 226 is shown in FIG. 11 but two or more such orifices may alternatively be included. It is preferable that those orifices be spaced along the circumference of the tubing so that at least one of the orifices will not be facing down and therefore be more likely to plug.

The Embodiment of FIGS. 16-20

A fourth embodiment of an emitter is depicted in FIGS. 16-20 and identified generally at 310. Emitter 310 may be similar in many respects to emitters 10, 110 and 210 so, once again, similar numbering is used in FIGS. 16-20 to identify tubing 312, first and second annular sealing portions 314 and 316, slots 318, annular body 319, first fluid flow path 320, labyrinth flow control section 322, labyrinth flow control channel 323 having an upstream end 321 and a downstream end 325, circumferentially-extending wall 327, and fluid distribution orifice 326.

However, emitter 310 may be different in that, in addition to a first fluid distribution channel 328, it typically includes an additional, circumferentially-extending channel on the opposite side of the first fluid distribution channel 328, called a second fluid distribution channel 330. It can be seen that first fluid distribution channel 328 and second fluid distribution channel 330 are provided in lieu of fluid distribution chambers 24 and 124 in the first two embodiments 10 and 110. Instead of the wall that surrounds fluid distribution chamber 24 and 124, a circumferentially-extending wall 329 that may be referred to as a fourth radially extending annular portion is disposed co-axially with the pair of radially-extending annular portions. The first and second fluid distribution channels 328 and 330 may be interconnected with downstream end 325 of labyrinth flow control channel 323. As in emitter 210 of FIGS. 11-15, downstream end 325 of labyrinth flow control channel 323 extends laterally or to the side, but because there is both a first and a second fluid distribution channel 328 and 330, the downstream end 325 of the labyrinth flow control channel 323 extends to both sides of the emitter 310 or, stated another way, in opposite directions.

Figure 16:
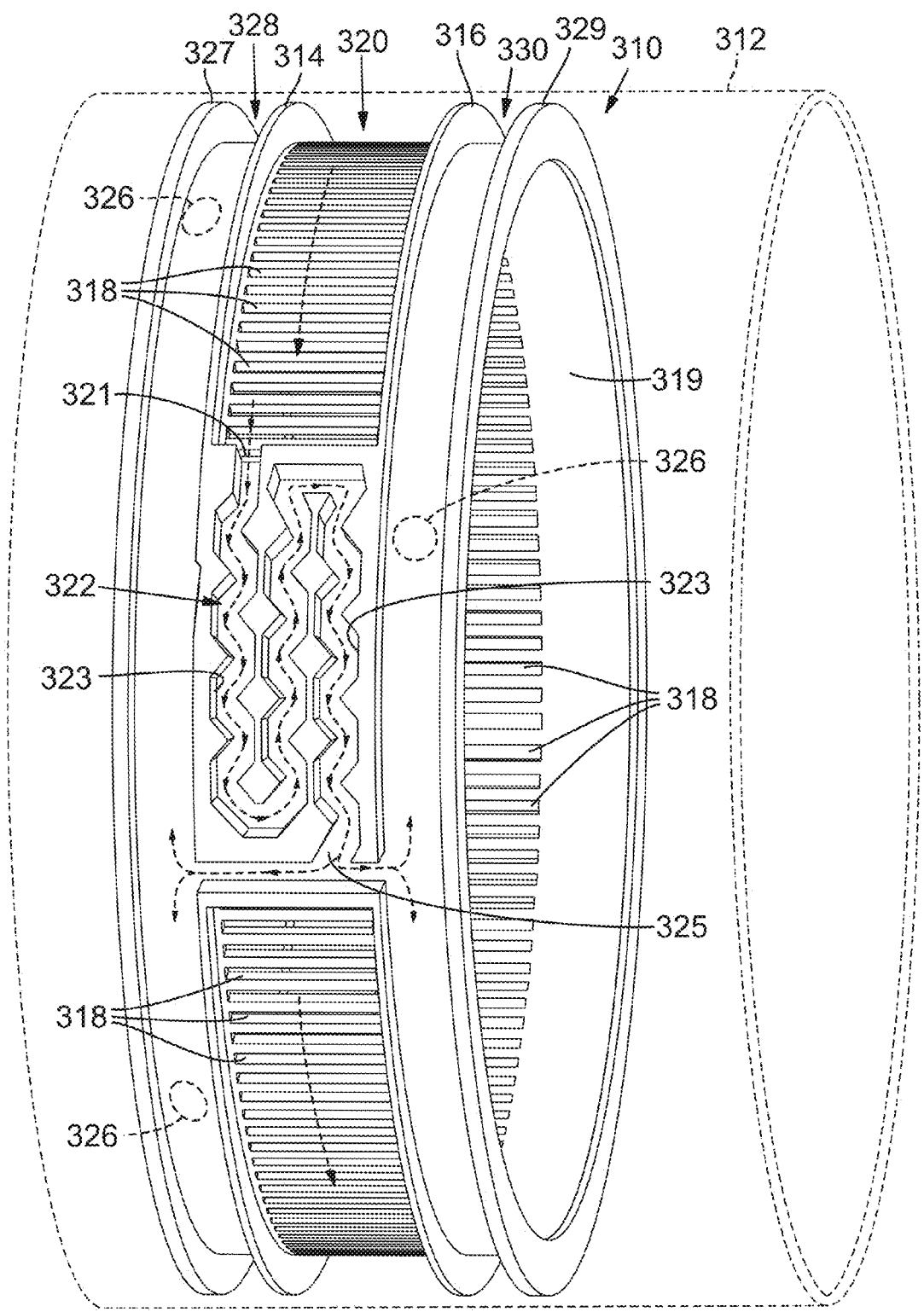
FIG. 16 is an isometric view of a fourth embodiment that includes a second side fluid exit channel, with the fluid distribution tube in which it may be positioned depicted in phantom.
Figure 17:
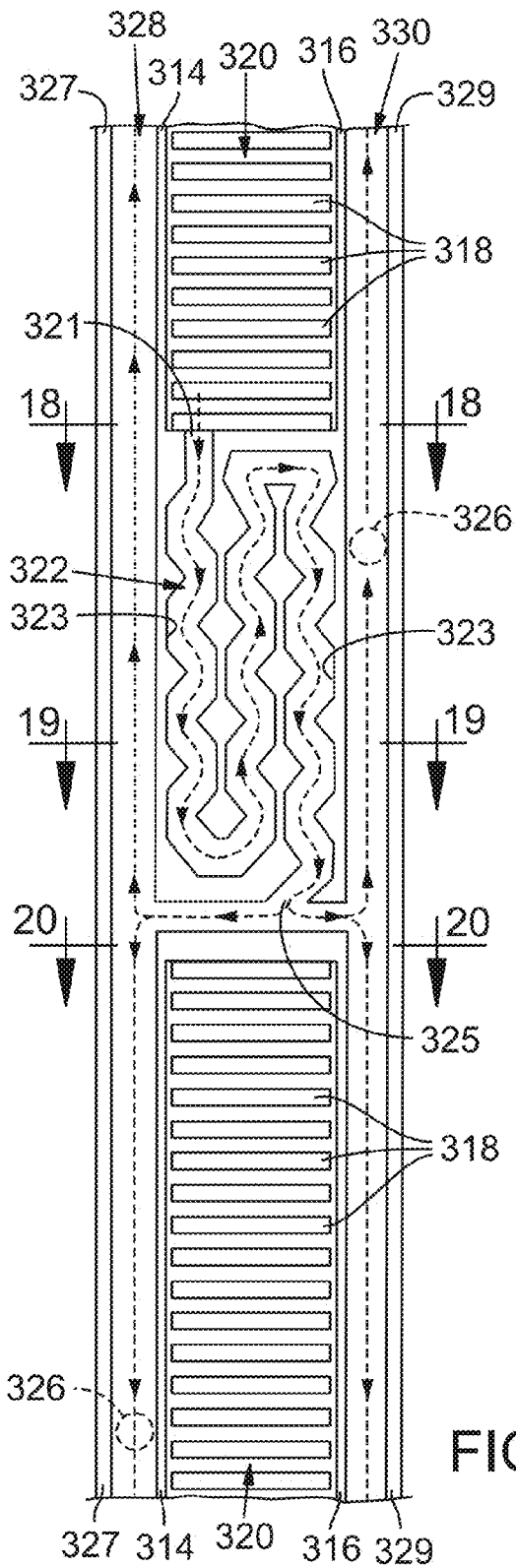
FIG. 17 is a schematic, fragmentary, two-dimensional representation of the surface configuration of a portion of the embodiment of FIG. 16.
Figure 18:
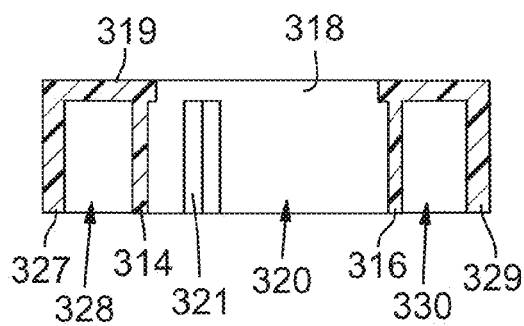
FIG. 18 is a sectional view taken along line 18-18 of FIG. 17.
Figure 19:
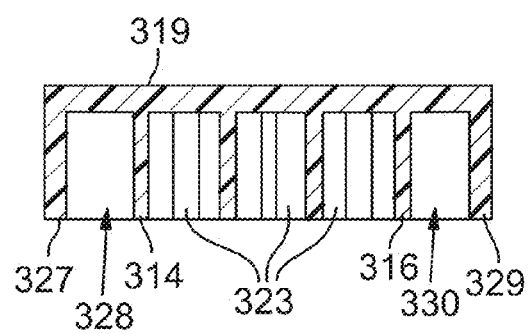
FIG. 19 is a sectional view taken along line 19-19 of FIG. 17.
Figure 20:
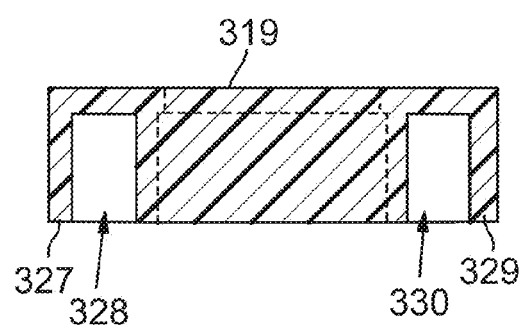
FIG. 20 is a sectional view taken along line 20-20 of FIG. 17.
Figure 21:
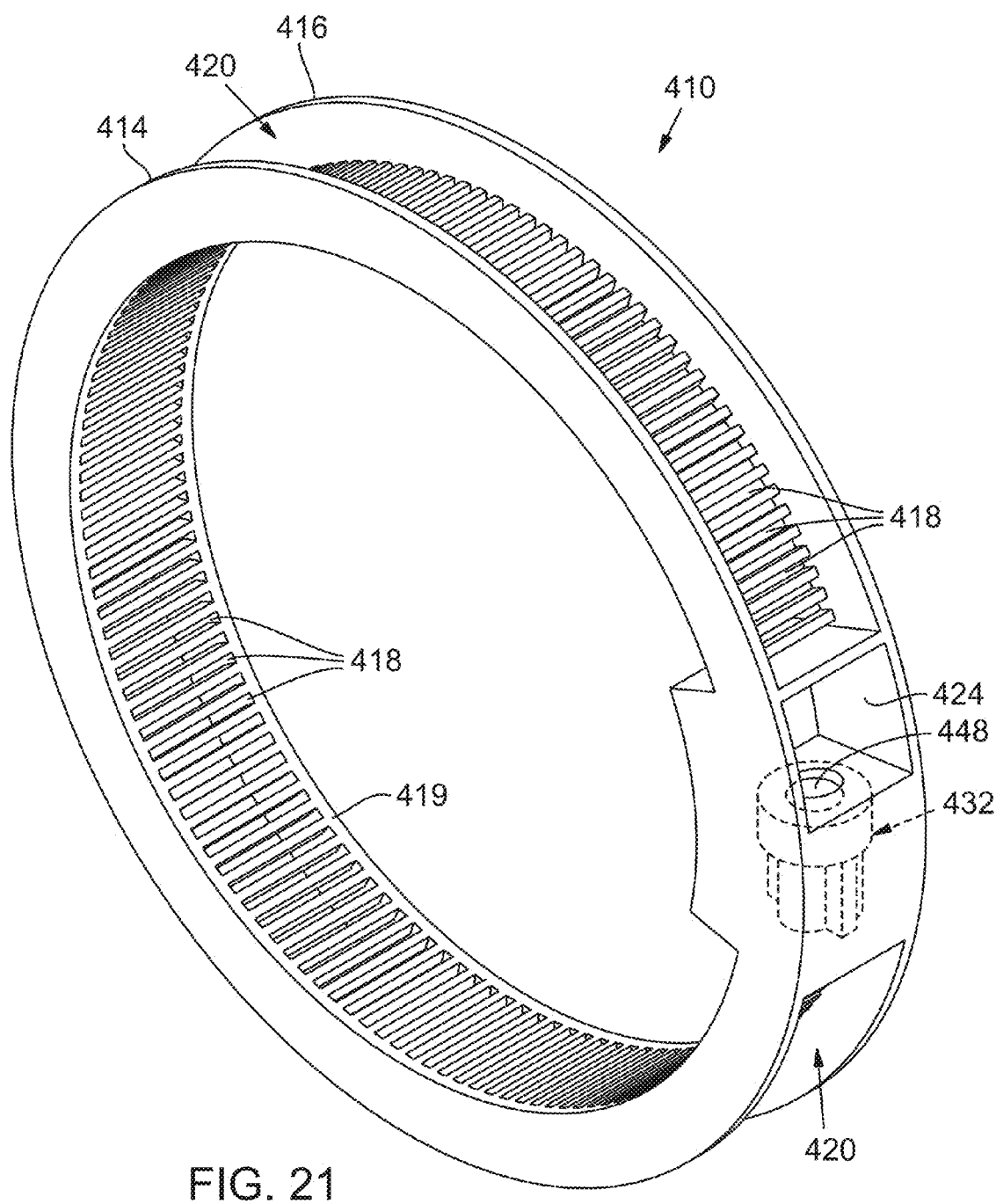
FIG. 21 is an isometric view of a fifth embodiment showing in phantom a pressure compensating valve that may be included in this embodiment.

Therefore, after passing through slots 318 in annular body 319, first fluid flow path 320 and labyrinth flow control channel 323, fluid flows into both first fluid distribution channel 328 and second fluid distribution channel 330, and moves through the channels until the fluid passes through fluid distribution orifice(s) 326. One such fluid distribution orifice 326 is shown in each of the fluid distribution channels 328 and 330 in FIG. 16 but two or more such orifices may alternatively be included in each channel. As shown in FIG. 16, fluid distribution orifices 326 are typically circumferentially offset from each other in order to reduce the likelihood that both of them will be face down in a dirt or debris field and be more susceptible to plugging.

The Embodiment of FIGS. 21-31

A fifth, so-called pressure compensating embodiment is depicted in FIGS. 21-31 and is identified generally at 410. Emitter 410 may be similar in many respects to emitters 10, 110, 210 and 310 so similar numbering is used in FIGS. 21-31 to identify tubing 412, first and second annular sealing portions 414 and 416, slots 418 in body 419, first fluid flow path 420, fluid distribution chamber 424 and fluid distribution orifice 426. However, emitter 410 may not include a labyrinth flow control section and may instead include a pressure compensating valve 432. Valve 432 is conventional in design. It is designed to sense the downstream pressure and when that pressure falls below a predetermined level, the valve opens to permit fluid to flow therethrough. With pressure compensating valve 432 in a closed position, only a small amount of fluid is permitted to pass through the valve, via a small pressure compensating valve channel 444.

Figure 22:
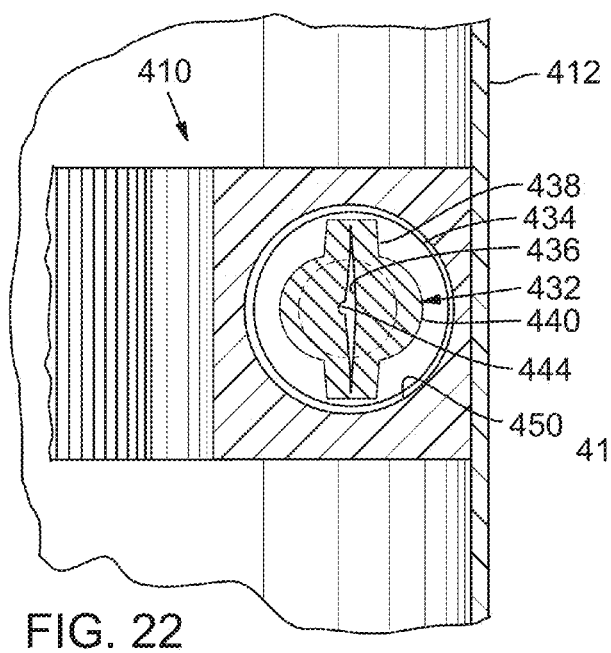
FIG. 22 is a fragmentary, sectional view of the embodiment of FIG. 21, taken looking longitudinally across the fluid distribution tube, depicting the pressure compensating valve in an open position.
Figure 23:
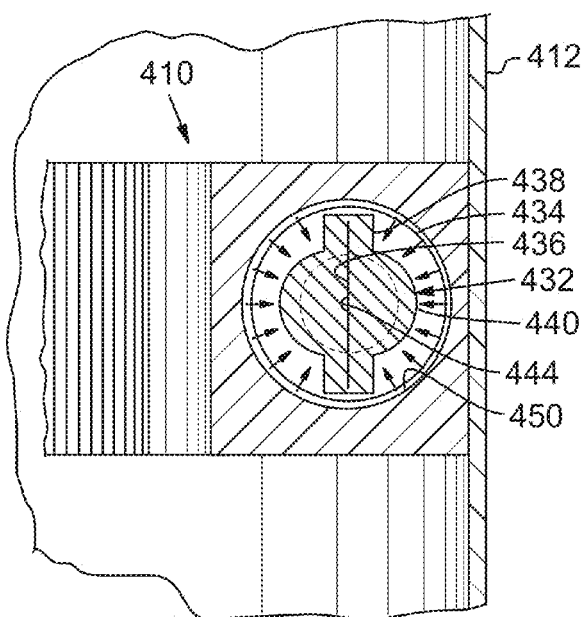
FIG. 23 is a fragmentary, sectional view of the embodiment of FIG. 21, taken looking longitudinally across the fluid distribution tube, corresponding to FIG. 22 except that the pressure compensating valve is shown in a closed position.
Figure 24:
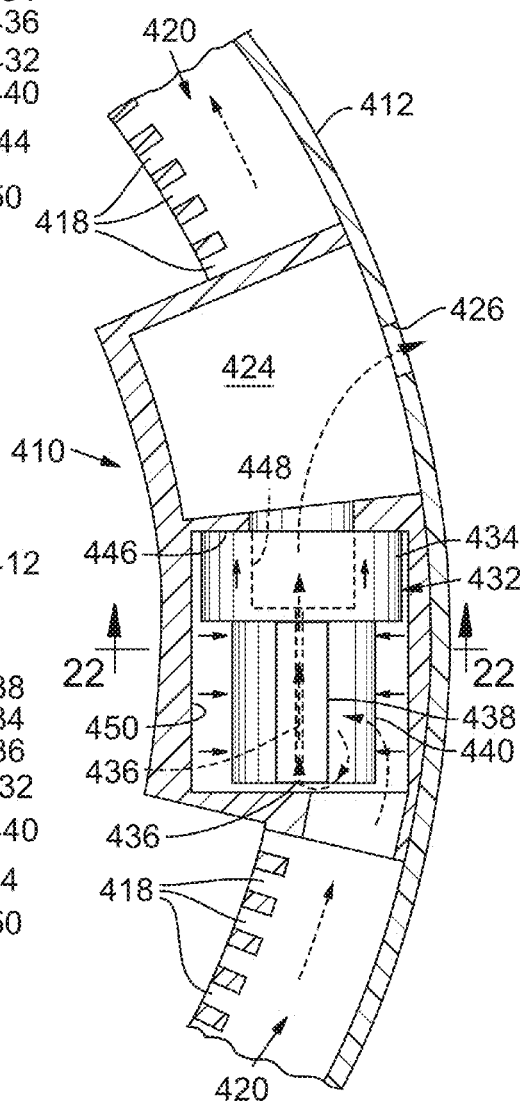
FIG. 24 is a fragmentary view of the pressure compensating valve of the embodiment of FIG. 21, looking through an end of the fluid distribution tube with the emitter disposed in the tube.
Figure 25:
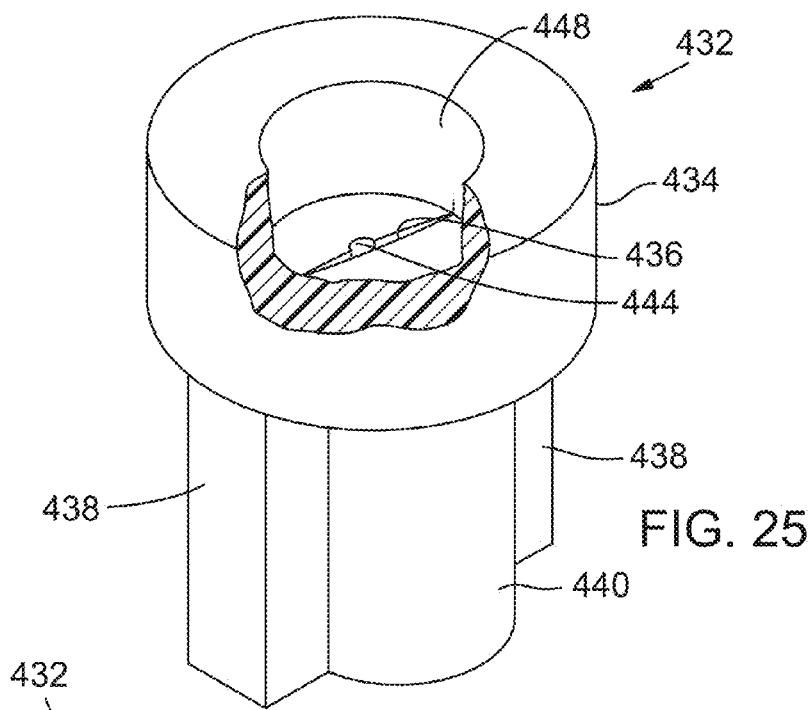
FIG. 25 is an isometric view of the pressure compensating valve of the embodiment of FIG. 21.
Figures 26, 27:
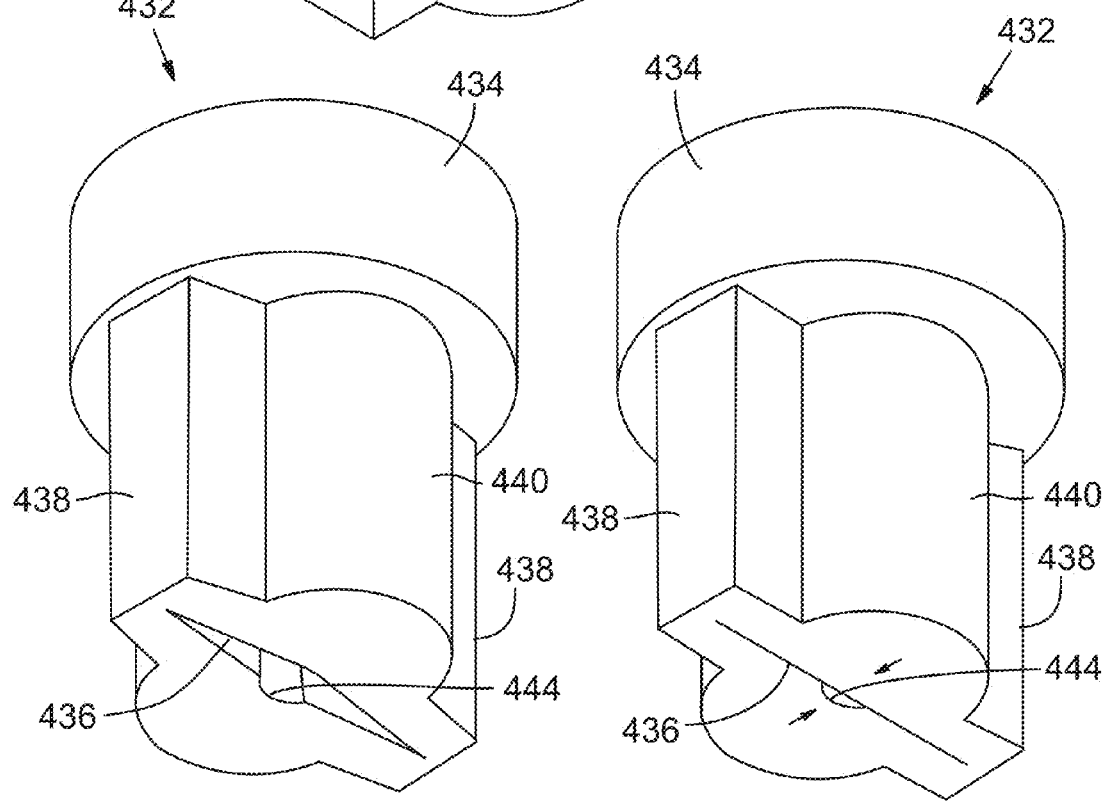
FIG. 26 is an isometric view of the pressure compensating valve of the embodiment of FIG. 21, showing the valve in an open position.
FIG. 27 is an isometric view of the pressure compensating valve of the embodiment of FIG. 21, showing the valve in a closed position.
Figure 28:
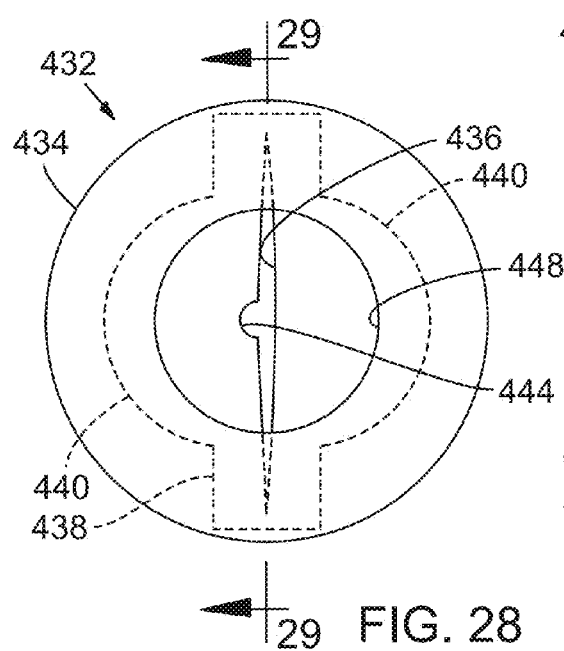
FIG. 28 is an end elevation view of the pressure compensating valve of the embodiment of FIG. 21 from the end opposite the valve diaphragm, showing the valve in an open position.
Figure 29:
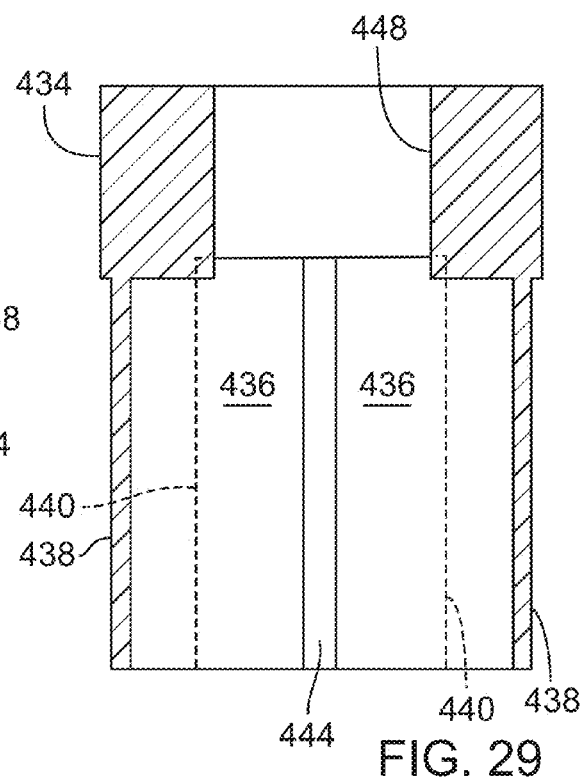
FIG. 29 is a side elevation, sectional view taken along lines 29-29 of FIG. 28.
Figure 30:
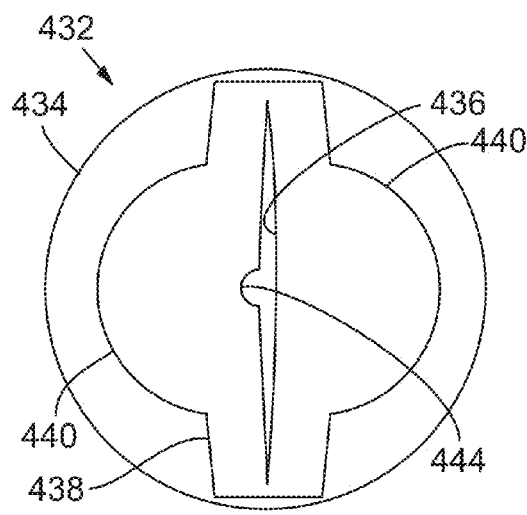
FIG. 30 is an end elevation view of the pressure compensating valve of the embodiment of FIG. 21 from the diaphragm end, with the valve open.
Figure 31:
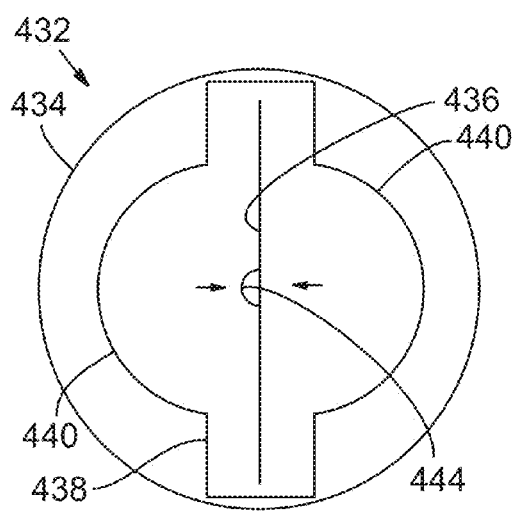
FIG. 31 is an end elevation view of the pressure compensating valve of the embodiment of FIG. 21 from the diaphragm end, with the valve closed.

Pressure compensating valve 432 is best shown in FIGS. 22-31. It may be formed of a soft plastic such as silicon, although any other material that will deform under pressure may alternatively be used. Valve 432 may include a valve base 434, a valve diaphragm 436 with channel 444, valve wings 438, and a rounded body 440. As shown in FIG. 24, pressure compensating valve 432 is positioned against a pressure compensating valve seat 446, and within a substantially cylindrical cavity 450. A pressure compensating valve seat opening 448 defined as a channel through valve seat 446 facilitates the flow of fluid from the valve 432 into fluid distribution chamber 424 and out orifice 426 in tube 412.

The operation of emitter 410 is similar to that of the other embodiments in that a portion of the fluid flowing through tubing 412 passes through slots 418 and into first fluid flow path 420. The fluid then passes along first fluid flow path 420 until it reaches the vicinity of pressure compensating valve 432. As shown in FIG. 24, the fluid may flow between wings 438 and around to diaphragm 436. If the valve is open, as shown in FIG. 22, fluid will flow through diaphragm 436, past base 434, through opening 448, into fluid distribution chamber 424 and out orifice 426. If the pressure in first fluid flow path 420 is higher relative to the downstream pressure in fluid distribution chamber 424, that upstream pressure will close valve 432 as schematically depicted in FIG. 23 such that the only flow through pressure compensating valve 432 will be through pressure compensating valve channel 444. Typically pressure compensating valve 432 is designed to open if the downstream pressure is less than 5 psi and is designed to close once the downstream pressure reaches 50 psi. But the valve may be set to open and close at any other desired pressure differential. The settings of the valve may be varied by changing the material from which the valve is formed or perhaps by changing the configuration of the valve.

Figure 32:
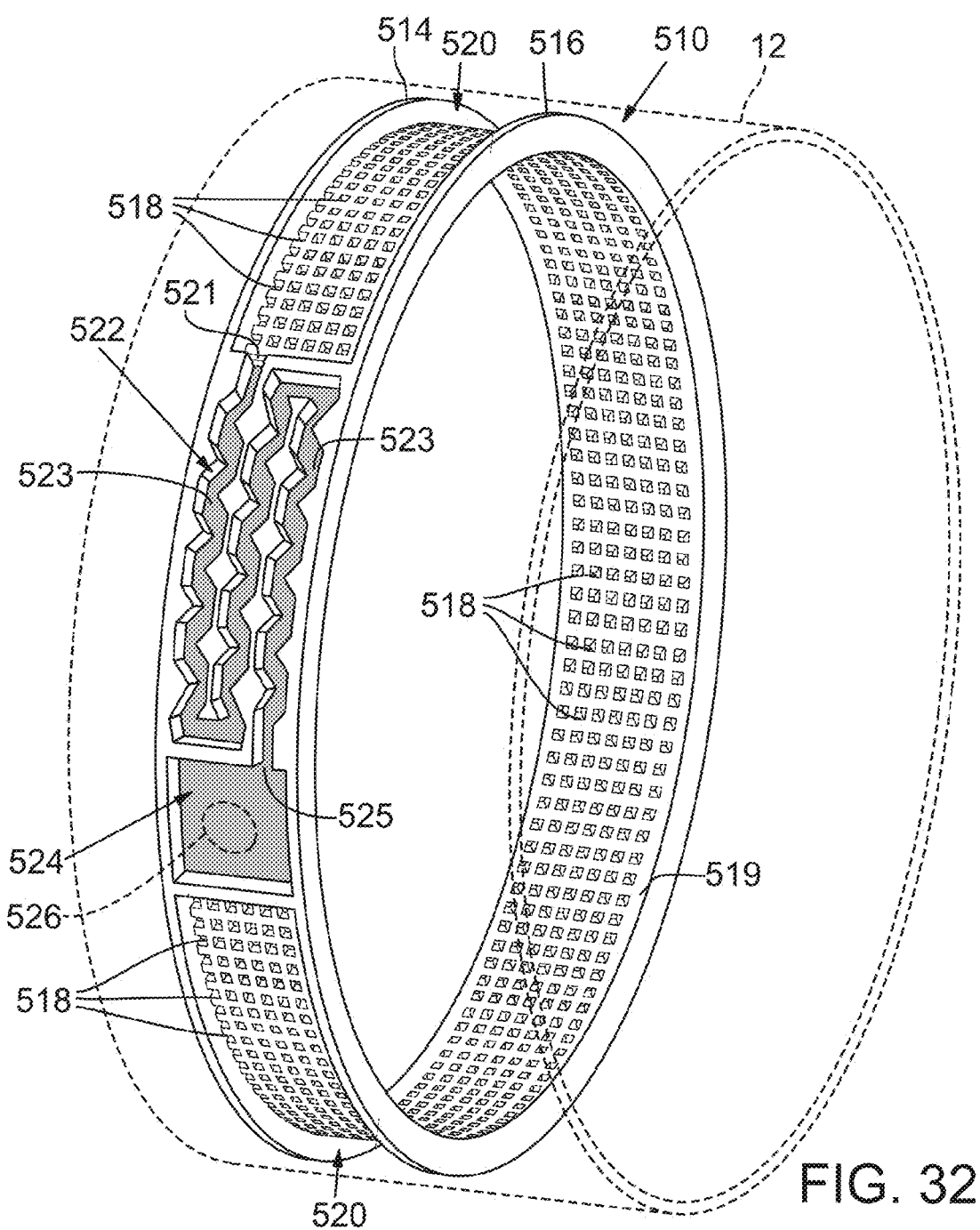
FIG. 32 is an isometric view of an embodiment like that of FIGS. 1-8 except that in place of the elongated slots, a mesh is included.

The Embodiment of FIG. 32

The embodiment of FIG. 32 is similar to that of FIGS. 1-8 except that instead of slots 18 that extend from side to side of emitter 10 between first and second annular sealing portions 14 and 16, emitter 510 includes a mesh of slots or apertures 518. It is possible that this mesh of slots would be included in any of the foregoing embodiments, but for purposes of simplification, additional views show a mesh in place of the slots that extend entirely from the first to the second annular sealing portions.

In other respects emitter 510 may be similar to emitter 10 and for this reason, similar numbering is used in FIG. 32 to identify first and second annular sealing portions 514 and 516, slots 518, annular body 519, first fluid flow path 520, labyrinth flow control section 522, labyrinth flow control channel 523 having an upstream end 521 and a downstream end 525, fluid distribution chamber 524 and fluid distribution orifice 526.

EXAMPLES

The following are examples of embodiments that are consistent with the foregoing detailed description:

Example 1

A fluid flow emitter to be mounted within a fluid distribution tube to control a rate at which fluid is distributed from the tube, comprising:

a cylindrical body having a pair of raised radially-extending annular portions extending circumferentially around the emitter, the raised portions defining a fluid flow path;

wherein the body defines a multiplicity of axially-extending slots extending from one of the pair of radially-extending annular portions to the other for a substantial portion of a circumference of the cylindrical body;

a flow control section comprised of a path in which the fluid pressure is reduced to the desired rate of distribution from the tube, the flow control section including an upstream end and a downstream end; and a fluid distribution region into which the flow control section discharges, the fluid distribution region being in fluid interconnection with at least one orifice defined in the fluid distribution tube;

wherein the raised radially-extending portions extend circumferentially around the emitter from the fluid distribution region to the upstream end of the flow control section.

Example 2

A fluid flow emitter to be mounted within a fluid distribution tube to control a rate at which fluid is distributed from the tube, comprising:

a cylindrical body having a pair of raised radially-extending annular portions extending circumferentially around the emitter, the raised portions defining a fluid flow path;

wherein the body defines a multiplicity of axially-extending slots covering a slot region around an inner periphery of the emitter;

a flow control section comprised of a path in which fluid pressure is reduced to a desired rate of distribution from the tube, the flow control section including an upstream end and a downstream end; and a fluid distribution region into which the fluid flow control section discharges, the fluid distribution region being in fluid interconnection with at least one orifice defined in the fluid distribution tube;

wherein the raised radially-extending portions and the slot region extend circumferentially around the emitter from the fluid distribution region to the upstream end of the flow control section.

Example 3

A fluid flow emitter to be mounted within a fluid distribution tube to control a rate at which fluid is distributed from the tube, comprising:

a cylindrical body having a pair of raised, radially-extending annular portions defining a first fluid flow path when in contact with an inner diameter of the fluid distribution tube;

wherein the body defines a multiplicity of axially-extending slots extending from one of the radially-extending annular portions to the other for a substantial portion of a circumference of the cylindrical body;

a flow control section comprised of a substantially circumferentially-extending labyrinth channel having upstream and downstream ends in which fluid pressure is reduced to a desired rate of distribution from the tube as it passes from the upstream to the downstream ends; and a first fluid distribution region receiving fluid from the flow control section, the fluid distribution region disposed under at least one orifice defined in the fluid distribution tube;

wherein the raised portions extend circumferentially from the first fluid distribution region to the upstream end of the labyrinth channel.

Example 4

The fluid flow emitter set forth in Example 3, wherein the first fluid distribution region comprises a first fluid distribution channel formed between the emitter and the inner diameter of the fluid distribution tube, extending between one of the radially-extending annular portions and a third radially extending annular portion disposed co-axially with the pair of radially-extending annular portions to receive fluid from the downstream end of the labyrinth channel and direct it through the at least one orifice in the fluid distribution tube.

Example 5

The fluid flow emitter set forth in Example 4, wherein the downstream end of the labyrinth channel extends laterally in opposite directions, the emitter further comprising a second fluid distribution region in the form of a second fluid distribution channel formed between the emitter and the inner diameter of the fluid distribution tube, extending between the other of the pair of radially-extending annular portions and a fourth radially extending annular portion disposed co-axially with the pair of radially-extending annular portions and receiving fluid from the laterally-extending downstream end of the labyrinth channel, wherein at least one of the orifices in the fluid distribution tube is in fluid interconnection with the first fluid distribution channel and at least one of which the orifices in the fluid distribution tube is in fluid interconnection with the second fluid distribution channel, so that the fluid flows from the labyrinth channel to at least two orifices in the fluid distribution tube via the first and second fluid distribution channels.

Example 6

A fluid distribution system including a series of fluid distribution tubes, each of the tubes including a plurality of fluid flow emitters mounted within the tubes to control a rate at which fluid is distributed from the tubes, the fluid flow emitters each comprising:

a cylindrical body having a pair of raised, radially- and circumferentially-extending annular portions, the raised portions defining a first fluid flow path when in contact with an inner diameter of one of the fluid distribution tubes;

wherein an inner periphery of the body defines a multiplicity of apertures slots forming a mesh region that extends from one of the pair of raised, radially-extending annular portions to the other;

a flow control section comprised of a substantially circumferentially-extending labyrinth channel having a circumferentially-facing upstream end receiving fluid from the first fluid flow path and a downstream end, in which fluid pressure is reduced to a desired rate of distribution from the tube as it passes from the upstream end to the downstream end; and a first fluid distribution region into which the downstream end of the labyrinth channel discharges, the first fluid distribution region being defined by a wall and being disposed under at least one orifice defined in one of the fluid distribution tubes;

wherein the raised radially- and circumferentially-extending annular portions and the slots region extend around the emitter from the wall defining the fluid distribution region to the upstream end of the labyrinth channel.

Example 7

A fluid flow emitter to be mounted within a fluid distribution tube to control a rate at which fluid is distributed from the tube, comprising:

a cylindrical body having a pair of raised, radially-extending annular portions defining a first fluid flow path when in contact with an inner diameter of the fluid distribution tube;

wherein the body defines a multiplicity of apertures forming a mesh disposed between the pair of radially-extending annular portions for a substantial portion of a circumference of the cylindrical body;

a flow control section comprised of a substantially circumferentially-extending labyrinth channel having circumferentially-extending upstream and downstream ends in which fluid pressure is reduced to a desired rate of distribution from the tube as it passes from the upstream to the downstream ends, wherein the flow control section defines a segment of the circumference of the emitter, and as to that segment, the labyrinth extends without any mesh therebetween; and a first fluid distribution region disposed in circumferential alignment with the flow control section and receiving fluid from the flow control section, the fluid distribution region disposed under at least one orifice defined in the fluid distribution tube;

wherein the raised portions extend circumferentially from the first fluid distribution region to the upstream end of the labyrinth channel.

Example 8

A fluid distribution system comprising:
a series of fluid distribution tubes having an inner diameter and being designed to convey fluid to a directed area;
a plurality of fluid flow emitters mounted within the tubes to control a rate at which fluid is distributed from the tubes, each of the fluid flow emitters comprising:

a cylindrical body extending circumferentially within and in contact with the inner diameter of one of the tubes in a direction transverse to the flow of fluid in the tube, the body including:

a pair of raised, radially-extending annular portions defining a first fluid flow path between the body and the inner diameter of the tube;

the body defining a multiplicity of apertures forming an aperture region disposed between the pair of radially-extending annular portions for at least a substantial portion of a circumference of the cylindrical body;

a flow control section comprised of a substantially circumferentially-extending labyrinth channel having circumferentially-extending upstream and downstream ends in which fluid pressure is reduced to the desired rate of distribution from the tube as it passes from the upstream to the downstream end; and a first fluid distribution region disposed in circumferential alignment with the flow control section and receiving fluid from the flow control section, the fluid distribution region disposed under at least one fluid distribution orifice defined in the fluid distribution tube;

wherein the raised portions extend circumferentially from the first fluid distribution region to the upstream end of the labyrinth channel.

Example 9

A fluid distribution system comprising:
a series of fluid distribution tubes having an inner diameter and being designed to convey fluid to a directed area;
a plurality of fluid flow emitters mounted within the tubes to control a rate at which fluid is distributed from the tubes, each of the fluid flow emitters comprising:

a cylindrical body extending circumferentially within and in contact with the inner diameter of one of the tubes in a direction transverse to flow of fluid in the tube, the body including:

a pair of raised, radially-extending annular portions defining a first fluid flow path between the body and the inner diameter of the tube;

the body defining a multiplicity of apertures forming an aperture region disposed between the pair of radially-extending annular portions and extending from, but not in fluid contact with, the first fluid distribution region, to the upstream end of the labyrinth channel;

a flow control section comprised of a substantially circumferentially-extending labyrinth channel having circumferentially-extending upstream and downstream ends in which fluid pressure is reduced to a desired rate of distribution from the tube as it passes from the upstream to the downstream end; and a first fluid distribution region receiving fluid from the flow control section and disposed under at least one fluid distribution orifice defined in the fluid distribution tube;

wherein the raised portions extend circumferentially from the first fluid distribution region to the upstream end of the labyrinth channel.

The disclosure set forth above may encompass multiple distinct inventions with independent utility. While each of these inventions has been disclosed in its preferred form, the specific embodiments thereof as disclosed and illustrated herein are not to be considered in a limiting sense, as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A fluid flow emitter to be mounted within a fluid distribution tube to control a rate at which fluid is distributed from the tube, comprising:
   a cylindrical body having a pair of raised radially-extending annular portions extending circumferentially around the emitter, the raised, radially-extending annular portions defining a fluid flow path;
   wherein the body defines a multiplicity of axially-extending slots extending from one of the pair of raised, radially-extending annular portions to the other for at least a portion of a circumference of the cylindrical body;
   a flow control section comprised of a path in which fluid pressure is reduced to a desired rate of distribution from the tube, the flow control section including an upstream end and a downstream end; and
   a fluid distribution region into which the flow control section discharges, the fluid distribution region being in fluid interconnection with at least one orifice defined in the fluid distribution tube;
   wherein the raised radially-extending annular portions extend circumferentially around the emitter from the fluid distribution region to the upstream end of the flow control section.

2. A fluid flow emitter to be mounted within a fluid distribution tube to control a rate at which fluid is distributed from the tube, comprising:
   a cylindrical body having a pair of raised radially-extending annular portions extending circumferentially around the emitter, the raised, radially-extending annular portions defining a fluid flow path;
   wherein the body defines a multiplicity of axially-extending slots covering a slot region around an inner periphery of the emitter;
   a flow control section comprised of a path in which fluid pressure is reduced to a desired rate of distribution from the tube, the flow control section including an upstream end and a downstream end; and
   a fluid distribution region into which the flow control section discharges, the fluid distribution region being in fluid interconnection with at least one orifice defined in the fluid distribution tube;
   wherein the raised radially-extending annular portions and the slot region extend circumferentially around the emitter from the fluid distribution region to the upstream end of the flow control section.

3. The fluid flow emitter of claim 1 or 2 wherein the flow control section comprises a circumferentially-facing pressure compensating valve that regulates the discharge of fluid, depending upon the pressure downstream of the valve.

4. The fluid flow emitter of claim 1 or 2 wherein the flow control section comprises a substantially circumferentially-extending labyrinth channel.

5. A fluid distribution system including a series of fluid distribution tubes, each of the tubes including a plurality of fluid flow emitters mounted within the tubes to control a rate at which fluid is distributed from the tubes, the fluid flow emitters each comprising:
   a cylindrical body having a pair of raised, radially- and circumferentially-extending annular portions, the raised, radially- and circumferentially-extending annular portions defining a first fluid flow path when in contact with an inner diameter of one of the fluid distribution tubes;
   wherein an inner periphery of the body defines a multiplicity of apertures or slots forming a mesh region that extends from one of the pair of raised, radially and circumferentially-extending annular portions to the other;
   a flow control section comprised of a circumferentially-extending labyrinth channel having a circumferentially-facing upstream end receiving fluid from the first fluid flow path and a downstream end, in which fluid pressure is reduced to a desired rate of distribution from the tube as it passes from the upstream end to the downstream end; and
   a first fluid distribution region into which the downstream end of the labyrinth channel discharges, the first fluid distribution region being defined by a wall and being disposed under at least one orifice defined in one of the fluid distribution tubes;
   wherein the raised radially- and circumferentially-extending annular portions and the mesh region extend around the emitter from the wall defining the first fluid distribution region to the upstream end of the labyrinth channel.

6. A fluid flow emitter to be mounted within a fluid distribution tube to control a rate at which fluid is distributed from the tube, comprising:
   a cylindrical body having a pair of raised, radially-extending annular portions defining a first fluid flow path when in contact with an inner diameter of the fluid distribution tube;
   wherein the body defines a multiplicity of axially-extending slots extending from one of the raised, radially-extending annular portions to the other for at least a portion of a circumference of the cylindrical body;
   a flow control section comprised of a circumferentially-extending labyrinth channel having upstream and downstream ends in which fluid pressure is reduced to a desired rate of distribution from the tube as it passes from the upstream to the downstream ends; and
   a first fluid distribution region receiving fluid from the flow control section, the first fluid distribution region disposed under at least one orifice defined in the fluid distribution tube;
   wherein the raised, radially-extending annular portions extend circumferentially from the first fluid distribution region to the upstream end of the labyrinth channel.

7. The fluid flow emitter of claim 6 wherein the slots cover a region extending circumferentially from the first fluid distribution region, but not in fluid communication with the first fluid distribution region, to the upstream end of the labyrinth channel.

8. The fluid flow emitter of claim 6 wherein the first fluid distribution region is defined by a wall extending radially to the inner diameter of the fluid distribution tube.

9. The fluid flow emitter of claim 6 wherein the first fluid distribution region comprises a first fluid distribution channel formed between the emitter and the inner diameter of the fluid distribution tube, extending between one of the raised, radially-extending annular portions and a third raised, radially extending annular portion disposed co-axially with the pair of raised, radially-extending annular portions to receive fluid from the downstream end of the labyrinth channel and direct it through the at least one orifice in the fluid distribution tube.

10. The fluid flow emitter of claim 9, further comprising a plurality of orifices defined in the fluid distribution tube adjacent each fluid flow emitter, the plurality of orifices being circumferentially spaced from one another, on opposite sides of the fluid distribution tube.

11. The fluid flow emitter of claim 9, wherein the downstream end of the labyrinth channel extends laterally and the first fluid distribution channel receives fluid from the laterally-extending downstream end of the labyrinth channel.

12. The fluid flow emitter of claim 10, wherein the downstream end of the labyrinth channel extends laterally in opposite directions, the emitter further comprising a second fluid distribution region in the form of a second fluid distribution channel formed between the emitter and the inner diameter of the fluid distribution tube, extending between the other of the pair of raised, radially-extending annular portions and a fourth raised, radially extending annular portion disposed co-axially with the pair of raised, radially-extending annular portions and receiving fluid from the laterally-extending downstream end of the labyrinth channel, wherein at least one of the orifices in the fluid distribution tube is in fluid interconnection with the first fluid distribution channel and at least one of which the orifices in the fluid distribution tube is in fluid interconnection with the second fluid distribution channel, so that the fluid flows from the labyrinth channel to at least two orifices in the fluid distribution tube via the first and second fluid distribution channels.

13. The fluid distribution system of claim 5, wherein the apertures or slots extend axially.

14. The fluid distribution system of claim 5 wherein the downstream end of the labyrinth channel of each of the emitters discharges laterally and the first fluid distribution region of the fluid flow emitter comprises a first fluid distribution channel defined between one of the raised, radially- and circumferentially-extending annular portions and the wall, the wall comprising a third raised, radially- and circumferentially-extending annular portion extending co-axially with the pair of raised, radially- and circumferentially-extending annular portions to receive fluid from the laterally-extending downstream end of the labyrinth channel and direct it through the at least one orifice in one of the fluid distribution tubes.

15. The fluid distribution system of claim 14, wherein the downstream end of the labyrinth channel of each of the emitters extends laterally in opposite directions, the emitter further comprising a second fluid distribution region in the form of a second fluid distribution channel defined between the other of the pair of raised, radially- and circumferentially-extending annular portions and a fourth radially- and circumferentially-extending annular portion extending co-axially with the pair of raised, radially- and circumferentially-extending annular portions and receiving fluid from the laterally-extending downstream end of the labyrinth channel, and wherein the fluid distribution tubes further comprise a plurality of orifices, at least one of which is in fluid interconnection with the first fluid distribution channel in at least some of the emitters and at least one of which is in fluid interconnection with the second fluid distribution channel in at least some of the emitters, so that in at least some of the emitters the fluid flows from the labyrinth channel to at least two orifices in the fluid distribution tubes via the first and second fluid distribution channels.

16. The fluid distribution system of claim 5, wherein the slots in the emitters extend axially.

17. The fluid distribution system of claim 14 or 15 wherein the mesh region extends entirely from one of the raised, radially- and circumferentially-extending annular portions to the other.

18. A fluid flow emitter to be mounted within a fluid distribution tube to control a rate at which fluid is distributed from the tube, comprising:
a cylindrical body having a pair of raised, radially-extending annular portions defining a first fluid flow path when in contact with an inner diameter of the fluid distribution tube;
wherein the body defines a multiplicity of apertures forming a mesh disposed between the pair of raised, radially-extending annular portions for a portion of a circumference of the cylindrical body;
a flow control section comprised of a circumferentially-extending labyrinth channel having circumferentially-extending upstream and downstream ends in which fluid pressure is reduced to a desired rate of distribution from the tube as it passes from the upstream to the downstream ends, wherein the flow control section defines a segment of a circumference of the emitter, and as to that segment, the labyrinth channel extends without any mesh therebetween; and
a first fluid distribution region disposed in circumferential alignment with the flow control section and receiving fluid from the flow control section, the first fluid distribution region disposed under at least one orifice defined in the fluid distribution tube;
wherein the raised, radially-extending annular portions extend circumferentially from the first fluid distribution region to the upstream end of the labyrinth channel.

19. The fluid flow emitter of claim 18 wherein the labyrinth channel includes long, circumferentially-extending portions, and shorter axially-extending portions, and the circumferentially-extending portions are at least 5 times the length of the axially-extending portions.

20. The fluid flow emitter of claim 19 wherein the circumferentially-extending portions are at least 10 times the length of the axially-extending portions.

21. The fluid flow emitter of claim 18 wherein the labyrinth channel extends entirely from a circumferential line in alignment with one of the pair of raised, radially-extending annular portions to the other raised, radially-extending annular portion.

22. A fluid distribution system comprising:
a series of fluid distribution tubes having an inner diameter and being designed to convey fluid to a directed area;
a plurality of fluid flow emitters mounted within the tubes to control fluid distribution from the tubes, each of the fluid flow emitters comprising:
a cylindrical body extending circumferentially within and in contact with the inner diameter of one of the tubes in a direction transverse to a flow of fluid in the tube, the body including:

a pair of raised, radially-extending annular portions defining a first fluid flow path between the body and the inner diameter of the tube;

the body defining a multiplicity of apertures forming an aperture region disposed between the pair of raised, radially-extending annular portions for at least a portion of the circumference of the cylindrical body;

a flow control section comprised of a circumferentially-extending labyrinth channel having circumferentially-extending upstream and downstream ends in which fluid pressure is reduced to a desired rate of distribution from the tube as it passes from the upstream to the downstream end; and a first fluid distribution region disposed in circumferential alignment with the flow control section and receiving fluid from the flow control section, the first fluid distribution region disposed under at least one fluid distribution orifice defined in the fluid distribution tube;

wherein the raised, radially-extending annular portions extend circumferentially from the first fluid distribution region to the upstream end of the labyrinth channel.

23. The fluid distribution system of claim 22 in which the apertures comprise slots extending from one of the pair of radially-extending annular portions to the other.

24. The fluid distribution system of claim 22 wherein the aperture region extends from, but is not in fluid contact with, the first fluid distribution region, to the upstream end of the labyrinth channel.

25. A fluid distribution system comprising:

a series of fluid distribution tubes having an inner diameter and being designed to convey fluid to a directed area;

a plurality of fluid flow emitters mounted within the tubes to control a rate at which fluid is distributed from the tubes, each of the fluid flow emitters comprising:

a cylindrical body extending circumferentially within and in contact with the inner diameter of one of the tubes in a direction transverse to a flow of fluid in the tube, the body including:

a pair of raised, radially-extending annular portions defining a first fluid flow path between the body and the inner diameter of the tube;

a flow control section comprised of a circumferentially-extending labyrinth channel having circumferentially-extending upstream and downstream ends in which fluid pressure is reduced to the desired rate of distribution from the tube as it passes from the upstream to the downstream end; and a first fluid distribution region receiving fluid from the flow control section and disposed under at least one fluid distribution orifice defined in the fluid distribution tube;

the body defining a multiplicity of apertures forming an aperture region disposed between the pair of raised, radially-extending annular portions and extending from, but not in fluid contact with, the first fluid distribution region, to the upstream end of the labyrinth channel;

wherein the raised, radially-extending annular portions extend circumferentially from the first fluid distribution region to the upstream end of the labyrinth channel.

26. A fluid flow emitter to be mounted within a fluid distribution tube to control a rate at which fluid is distributed from the tube, comprising:

a cylindrical body having a pair of raised, radially- and circumferentially-extending annular portions defining a first fluid flow path when in contact with an inner diameter of the fluid distribution tube;

wherein the body includes a multiplicity of axially-extending slots defining a slot region extending from one of the radially-extending annular portions to the other for at least a portion of a circumference of the cylindrical body;

a flow control section comprised of a circumferentially-extending labyrinth channel having upstream and downstream ends in which fluid pressure is reduced to a desired rate of distribution from the tube as it passes from the upstream to the downstream ends; and a first fluid distribution region receiving fluid from the flow control section, the first fluid distribution region disposed under at least one orifice defined in the fluid distribution tube;

wherein the raised, radially-extending portions and the slot regions extend circumferentially from the first fluid distribution region to the upstream end of the labyrinth channel.

* * * * *